(12) United States Patent
Fenlon

(10) Patent No.: US 6,202,476 B1
(45) Date of Patent: Mar. 20, 2001

(54) METHOD OF AND APPARATUS FOR TESTING FOR LEAKS IN A PACKAGE

(75) Inventor: Christopher Fenlon, Oby (GB)

(73) Assignee: Testamatic Limited, Bristol (GB)

( * ) Notice: Subject to any disclaimer, the term of this patent is extended or adjusted under 35 U.S.C. 154(b) by 0 days.

(21) Appl. No.: 09/029,352

(22) PCT Filed: Aug. 19, 1996

(86) PCT No.: PCT/GB96/02024

§ 371 Date: Feb. 24, 1998

§ 102(e) Date: Feb. 24, 1998

(87) PCT Pub. No.: WO97/08529

PCT Pub. Date: Mar. 6, 1997

(30) Foreign Application Priority Data

Aug. 25, 1995 (GB) .................................... 9517446
Feb. 27, 1996 (GB) .................................... 9604130

(51) Int. Cl.[7] .............................. G01M 3/34; B65B 57/00
(52) U.S. Cl. ................................... 73/49.3; 73/45.4; 53/53
(58) Field of Search .................... 73/49.3, 45.4, 73/52; 53/53

(56) References Cited

U.S. PATENT DOCUMENTS 3,874,144 * 4/1975 Feigel ........................................ 53/53
3,918,293 * 11/1975 Feigel ...................................... 73/49.3
4,148,213 * 4/1979 Prakken .................................. 73/45.4
4,510,730 * 4/1985 Edmondson ........................... 73/49.3
4,649,740 * 3/1987 Franklin ................................. 73/49.3
4,671,101 * 6/1987 Franklin ................................. 73/49.3
4,697,452 * 10/1987 Prakken ................................. 73/49.3
4,955,226 * 9/1990 Beaty et al. ........................... 73/49.3
5,279,099 * 1/1994 Goodman et al. ........................ 53/53
5,284,003 * 2/1994 Goodman et al. ...................... 53/437
5,287,729 * 2/1994 Lehman ................................. 73/49.3
5,533,385 * 7/1996 Frievalt ................................. 73/49.3
5,542,288 * 8/1996 Fenlon .................................. 73/49.3
5,786,530 * 7/1998 Fenlon .................................. 73/49.3

FOREIGN PATENT DOCUMENTS 2162648    2/1986   (GB) .
2172402    9/1986   (GB) .
2178858    2/1987   (GB) .
2259776 *  3/1993   (GB) .............................. G01M/3/36

* cited by examiner

Primary Examiner—Hezron Williams
Assistant Examiner—Jay L. Politzer
(74) Attorney, Agent, or Firm—Koppel & Jacobs; Michael J. Ram

(57) ABSTRACT

A method of and apparatus for testing for leaks in a package is provided. The package is compressed under the weight of a test element (16). The position of the test element is measured at least twice and the positions are compared to check movement of the test head due to gas or liquid escape from the package.

14 Claims, 3 Drawing Sheets

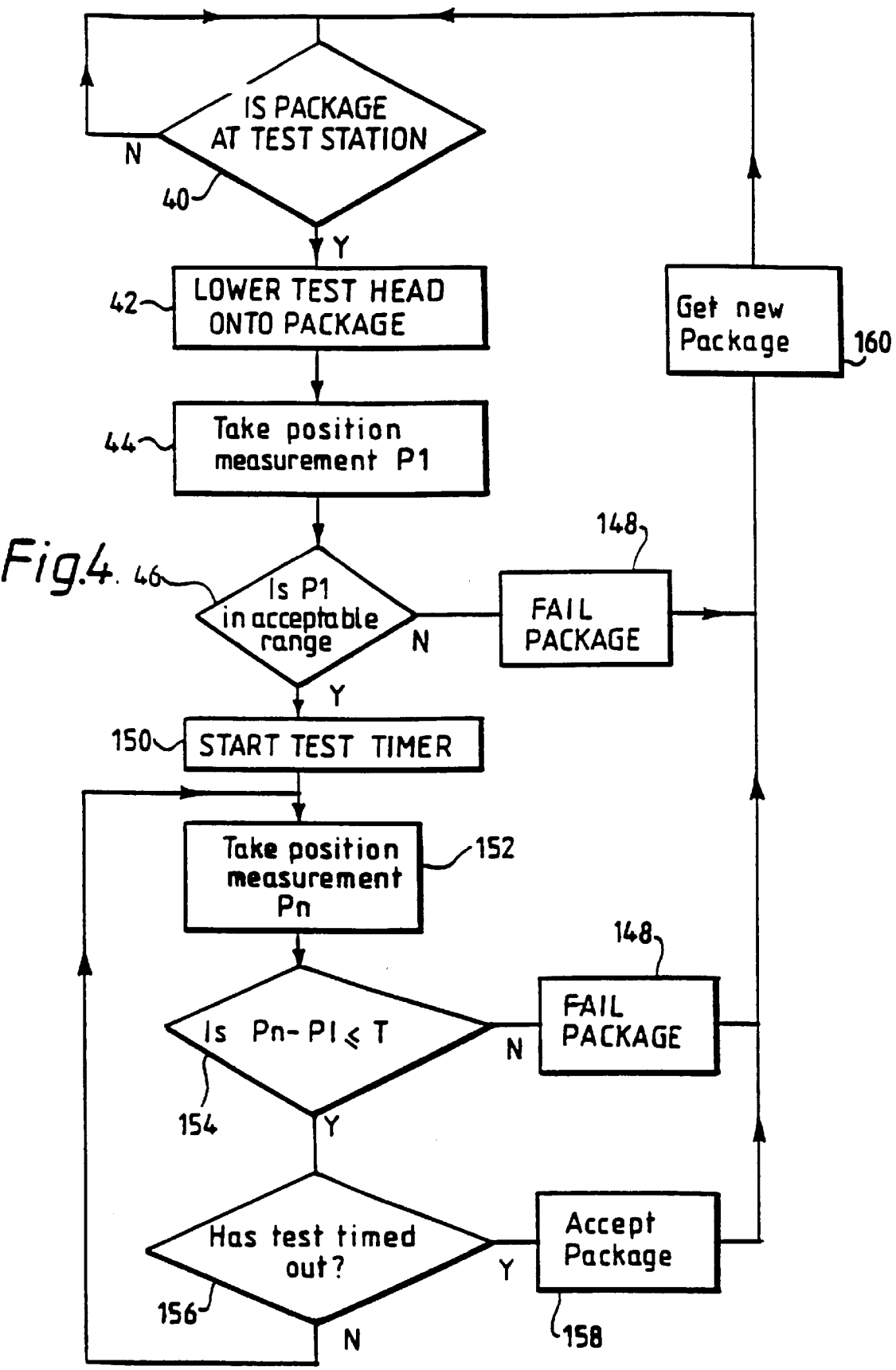

METHOD OF AND APPARATUS FOR TESTING FOR LEAKS IN A PACKAGE

The present invention relates to a method of and apparatus for testing for leaks in a package. Pre-packaged food products, such as cuts of meat and pre-prepared meals or snacks (such as crisps), are often packaged in one of two ways. The products may be vacuum packed so as to remove air from the interior of the packaging, or the products may be gas filled packed, in which the products, such as meat or crisps, are sealed within a gas tight package together with a quantity of gas. The gas used may vary upon the product that is packed. In either case, it is important that the pack does not leak in order to prevent spoilage and/or to ensure that the product has an acceptable shelf life.

Liquids, for example. fruit juices, are also provided in flexible packages which must be leak-tight in order to keep the product fresh and to avoid making a mess.

U.S. Pat. No. 4,649,740 discloses a testing apparatus in which flexible packages are indexed through at least two test stations. A package is stopped at each test station and a load is applied thereto via probe rods. Two successive stations apply the same load to the package and the effective thickness of the flexible package is measured in each case. The thickness measurements are compared and a difference is deemed to show a defective package.

WO-9317317 discloses a package tester having two test stations in a line. The arrangement does not require the packages to be brought to a halt at each test station. The first test station applies a first load to a package via a pneumatic actuator. The second test station applies a different load, and also uses a pneumatic actuator. Such an arrangement can produce spurious results if the air pressure to each actuator is not well controlled. In fact, because the thickness of the packages must be measured with great precision, such an arrangement can even be affected by changes in ambient air pressure.

According to a first aspect of the present invention, there is provided an apparatus for testing for leaks in a package, comprising a test element which is brought into abutment with a package, and a position sensor for measuring the position of the test element, in which at least a portion of the package is compressed by the weight of the test element.

It is thus possible to provide a package tester in which the load applied to a package is derived solely from the weight of the test element and is not dependent upon the correct functioning of an actuator. The tester can test both gas and liquid filled packages. In this context, gas filled packages includes sealed packages containing a product and a gas. An example of such a package is a bag of crisps.

Preferably, the test element is brought into abutment with the upper surface of the package under test.

The tester may be arranged, in use, to make a first measurement of the position of the test element after it has been lowered onto the package, to wait for a predetermined period, and then to make a second measurement of the position of the test element. The first and second positions are then compared and the package is indicated as being faulty when the second measurement differs from the first measurement by more than a predetermined amount.

However, the applicant has realized that this delay is not always necessary. In a modification, the test can still be set to have a maximum fixed duration, but multiple measurements can be taken during the test period and the test can be terminated if the difference between any two of the measurements exceeds a predetermined value. Thus, if the package has a significant leak, the leak can be detected in a time that is shorter than the maximum time allocated to the test. Consequently, the test time can be shortened for leaky packages and the tester can then commence testing the next package. Thus, the rate at which packages are tested can be increased.

Preferably, the tester is arranged to check that the first measurement falls within an acceptable range of values. It is therefore possible to determine whether a package has become distorted, whether it suffers from a gross leak, or whether it contains an acceptable volume of fluid.

The force applied to the package by the tester head urges fluid to escape from any leaks in the package. The leakage of fluid causes the test head to move as the package deflates. It is thus possible to detect a leak by testing for movement of the test head while it is in contact with the package.

Advantageously, the package tester is removably supported in a frame, such that the package tester can be demounted from the frame and replaced by a different testing arrangement or by a plurality of package testers attached to a common support. Thus, it is possible to convert the tester between single-lane and multi-lane use at a given test station. The products may be moved to and from the test heads on one or more conveyor belts, or on a platen. The test may be performed at each test head of a multihead machine. The data from one test head may also be compared with data derived from another test head.

Advantageously, the test element is lowered in a vertical direction onto the top of the package to be tested. Movement of the test element may be controlled by one or more actuators which engage a downwardly facing surface of the test element such that connection between the test element and the one or more actuator is severed when the test element is supported by the package to be tested. Such an arrangement ensures that the load supplied to the package is derived solely from the weight of the test element and that friction within the actuator. damage to the actuator (such as seal wear) or changes in the actuator force (such as problems in regulating gas pressure in a pneumatic actuator) does not alter the load applied to the package or impede motion of the test element during the test. The actuator is arranged to only apply an upward force which urges the test element away from the package.

Many forms of position sensor may be used to measure the position of the test element. The test element may, for example, carry an upstanding rack which cooperates with a gear to drive a rotary position transducer.

Alternatively, the one or more test heads may comprise a rotary transducer geared to the linear element or coupled to a cam shaped element. The use of a cam shaped element has the advantage that motion of the package to and from the test head causes the cam shaped element to engage and disengage from the package automatically. This avoids the need to provide actuators to control the engagement of the test element with the package.

Preferably, the comparisons of the measurements are made by a programable data processor.

According to a second aspect of the present invention, there is provided a method of testing for leaks in a package, comprising bringing a test element into abutment with at least a portion of the package to be tested, making a first measurement of the position of the test element, making at least one further measurement of the position of the test element, comparing at least one further measurement with a preceding measurement and indicating the package to be faulty if the comparison exceeds a predetermined value.

Preferably, at least one further measurement is compared with the first measurement.

Advantageously, the at least one further measurement is made shortly after the first measurement. The delay between the measurements need not be a predetermined fixed delay but may, for example, be dependent upon the time taken for a data processor to execute other tasks or to cycle through this task.

Advantageously, the test element is placed on at least a portion of the package to be tested, allowing the package or portion thereof to deform under the weight of the test element. The first measurement of the position of the test element is then made. Advantageously, the at least one further measurement includes a second or final measurement of the position of the test element, which is performed a predetermined time after the first measurement. A data processor forms a difference between the first and the second measurements and indicates the package to be faulty when the difference exceeds a first threshold.

Thus, the test has a predetermined maximum duration. However, when the at least one further measurement comprises a plurality of measurements, it is also possible to terminate the test early if the different between a pair of the measurements exceeds a threshold.

The present invention will further be described, by way of example, with reference to the accompanying drawings, in which:

FIG. 4 is a flow diagram illustrating a modification of the operation of the tester shown in FIG. 1.

Figure 1:
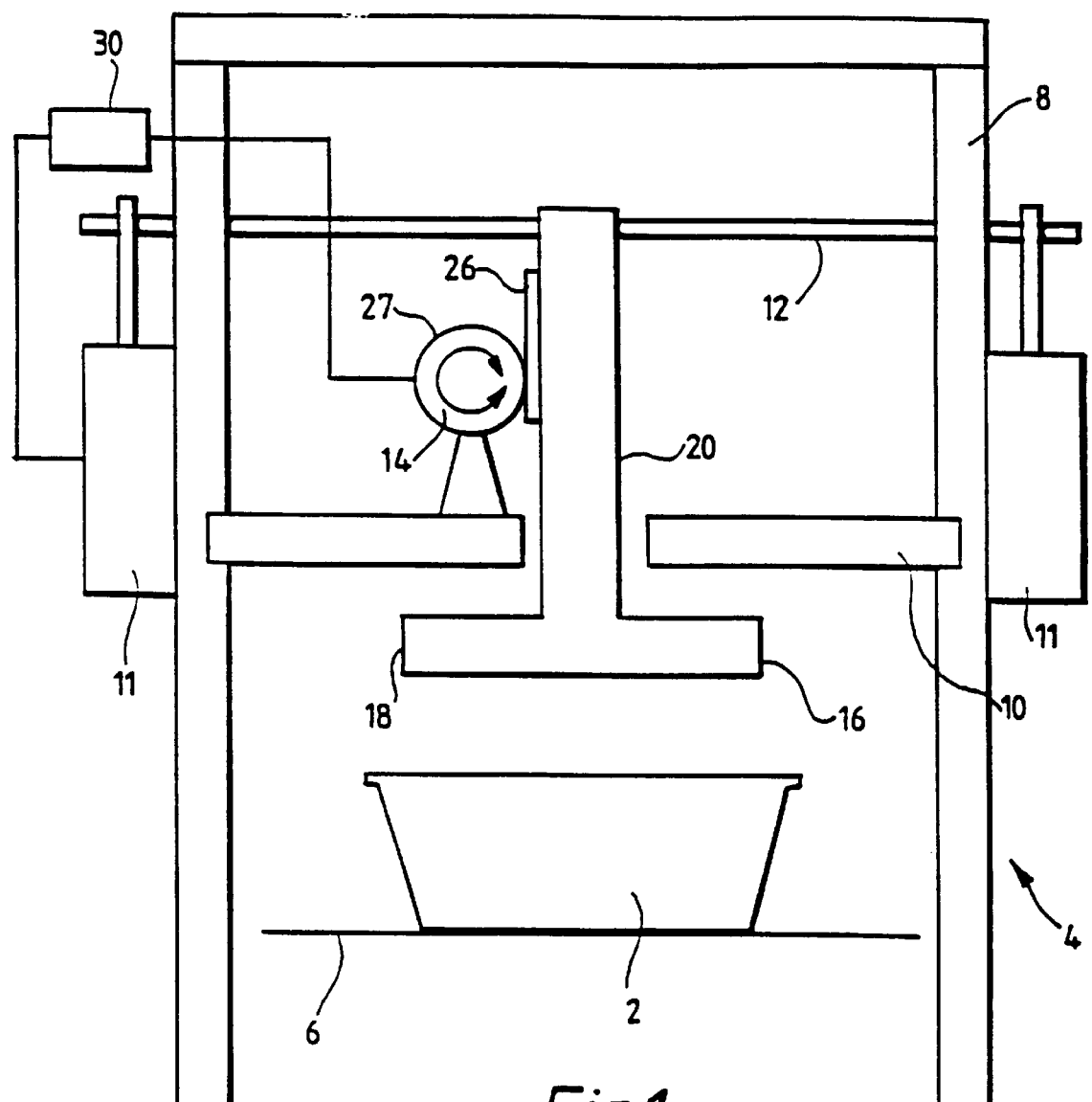
FIG. 1 is a schematic view of a package tester constituting an embodiment of the present invention.

FIG. 1 schematically illustrates a package tester for testing the integrity of packages. A package to be tested 2 is conveyed to the package tester 4 by a conveyor 6. A sensor (not shown), such as a light sensitive cell, monitors the position of the package 2 and halts the conveyor 6 when the package has arrived at a test station incorporating the package tester. The test station comprises a frame 8 which supports a demountable (i.e. removable) platform 10. The platform 10 supports a position transducer 14 and guide rods (not shown) which extend from a test element 16 and pass in sliding contact through guide channels so as to guide the test element 16 along a vertical path. The frame 8 also supports actuators 11 attached to either end of a bar 12 which is substantially horizontal and is moved vertically by the actuators 11.

Figure 2:
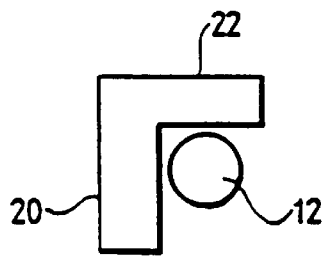
FIG. 2 illustrates the mechanism for lifting the test head in greater detail.

The test element 16 comprises a plate 18 which has an upwardly extending portion 20 which carries a lip 22 at the uppermost portion thereof. The bar 12 extends underneath the lip 22 such that the bar 12 can be brought into engagement with the lip 22 in order to lift the test element 16, as shown in FIG. 2. FIG. 2 is a view of the attachment between the test element 16 and the bar 12 viewed along the longitudinal axis of the bar 12. Thus, upward motion of the bar 12 brings the bar into contact with the lip 22 thereby enabling the test element 16 to be lifted above the conveyor 6. The test element 16 also carries a vertically extending rack 26 which engages a gear 27 connected to the rotary position transducer 14 such that vertical displacement of the test element 16 is measured by the rotary position transducer. A programable data processor 30 is arranged to control the operation of the actuators 11 and to monitor the output of the position transducer 14. The position transducer may be geared so as to enable the position of the test head to be measured to a resolution of 0.03 mm or better.

The demountable platform 10 is illustrated as supporting only one test element. However, other platforms may be provided which support a plurality of test elements. The test elements may be arranged to test different packs in parallel and or different sealed positions of a multi-portion pack. The platforms may be rapidly interchanged and all utilise the actuator and bar arrangement for lifting the test elements.

Figure 3:
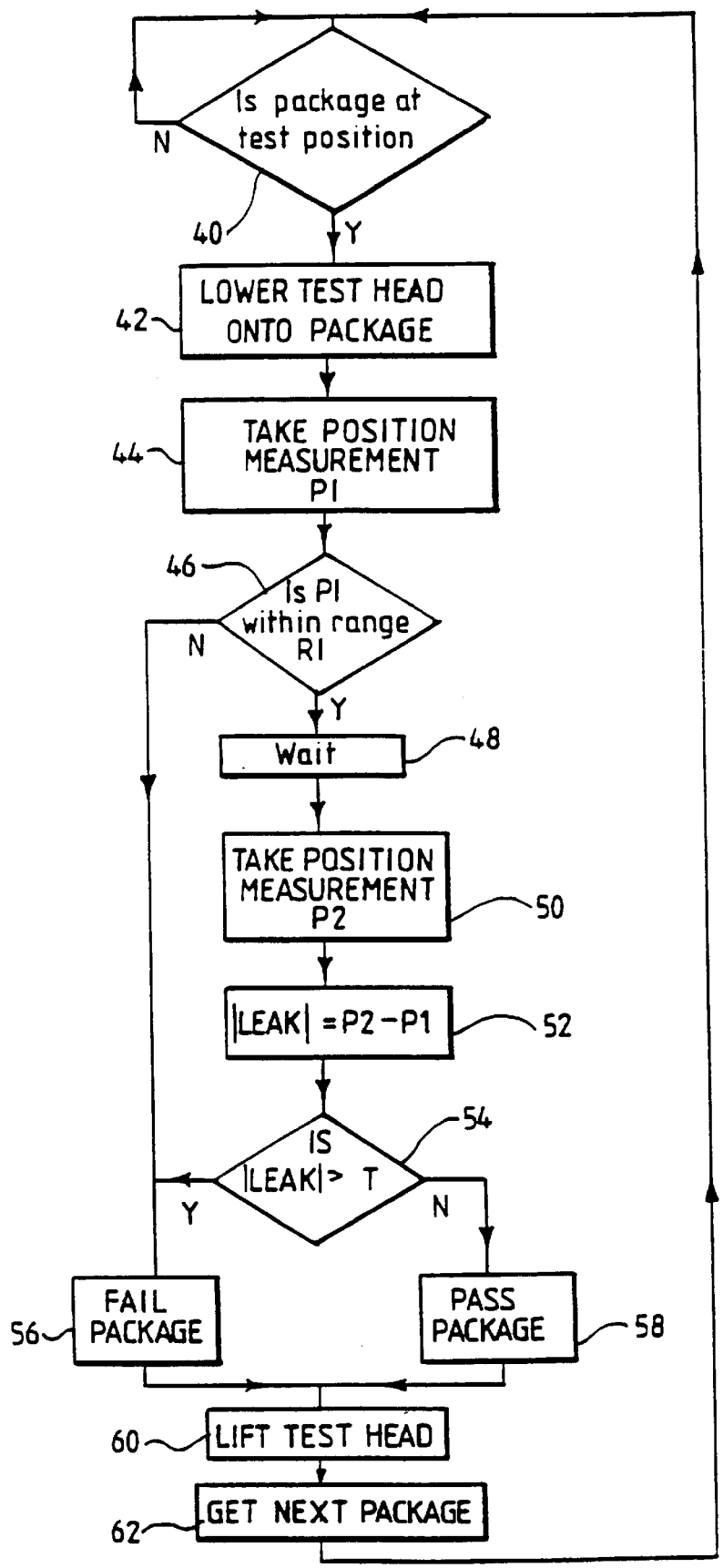
FIG. 3 is a flow diagram representing the operation of the tester illustrated in FIG. 1.

The operation of the test station will now be described with reference to FIG. 3.

The data processor 30 performs a check at step 40 to ensure that the package has reached the test position. Once the package has reached the test position control is passed to step 42, where the data processor 30 operates the actuators 11 so as to lower the test element 16 onto the package. This step may be omitted if some other means of bringing the test head into abutment with the package is provided. Once the test element has been lowered onto the package, the output of the rotary position transducer 14 is stored as a first position measurement P1 at step 44. Step 46 checks that the value of P1 within a predetermined range R1. The range R1 is chosen such that it just encompasses the expected height of all properly formed packages of the type being tested. Thus, this step enables gross leaks, such as might be encountered if the lid of the package had failed to be secured or if a bag was improperly filled or was split, to be identified. This step also enables packages which have too little or too much gas (or liquid) in them to be identified. The volume of gas is critical to the performance of the package and the inclusion of too much gas within the package could cause the package seals to be compromised due, for example, to thermal expansion of gas within the package. Control is passed to step 56 to mark the package as faulty if P1 is not within the range R1, whereas control is passed to step 48 if P1 is within the range R1. Step 48 causes the tester to wait for a predetermined time delay, typically of a couple of seconds, before control is passed to step 50. The position of the test element 16 is remeasured at step 50 and stored as value P2. Control is then passed to step 52 which forms the value LEAK as the modulus of the difference between the values P2 and P1. The value of LEAK is compared with a threshold T at step 54. If the package has a leak, air or other fluid will be expelled from the package under the weight of the test element 16 and the test element would slowly descend during the wait introduced at step 48. The manufacturing requirement may be such that small leaks (i.e. leaks equivalent to a hole of less than a given diameter) are acceptable and the threshold value T is set by the machine operators so as to allow sufficiently small leaks within a package to be tolerated and also to allow for non-linearity or quantisation error within the rotary position transducer. Control is passed to step 56 if the value of LEAK is greater than the threshold value T, whereas control is passed to step 58 if the value of the LEAK is less than the threshold value T. Step 56 asserts a signal to indicate that the package is faulty and this signal may be used to operate a diverter to remove faulty packages from the conveyor. Step 58 asserts a signal to indicate that the package has passed the test. Control is passed from steps 56 and step 58 to step 60, where the data processor 30 operates the actuator 11 so as to lift the test element 16 away from the conveyor 6 so that the conveyor can be operated to remove the package and to present the next package for testing (step 62). Control is then returned to step 40 such that the testing procedure can be repeated. This procedure is equally applicable for testing liquid filled packages.

FIG. 4 is a flow diagram of a modified test procedure. Rather than only making a measurement at the beginning of the test and another measurement at the end of the time period allotted to the test, the modified test sequence makes a plurality of measurements during the duration of the test, and can indicate a package as being unacceptable as soon as two of the measurements differ by more than an acceptable amount.

Steps 40 to 46 are as described hereinabove with reference to FIG. 3.

Following step 46, control is passed to step 148 to mark the package as faulty if P1 is not within the range R1, whereas control is passed to step 150 if P1 is within the range R1. Step 46 can be omitted if desired and control passed directly to step 150. Step 150 starts a timer which measures the duration of the test. The position of the test element 16 is remeasured at step 152 and stored as value Pn. Control is then passed to step 154 which forms the difference between the values Pn and P1 and compares the difference with a threshold T. If the package has a leak, air will be expelled from the package under the weight of the test element 16 and the test element would slowly descend during the test.

The transducers used give a digital pulse every time the test head moves a predetermined distance set by the intrinsic resolution of the transducer and the mechanical connection between the transducer and the test head. The value of the T may be set to allow Pn to vary from P1 by a small amount. Alternatively, the value of T may be set equal to unity such that any difference between P1 and Pn is identified and can cause the package to be rejected as faulty.

If the package passes step 154, control is passed to step 156 which checks that the maximum time allocated to the test has not been exceeded. If the time limit for the test has not been reached, control is returned to step 152. If the time limit has been reached, control is passed to step 158 which accepts the package.

If desired, steps 150 and 156 can be omitted such that control passes directly from step 46 to step 152, then to step 154, and then to step 158 or 148. In such a scheme, the method may be incorporated as part of a more complex test strategy.

Control is passed from steps 148 and 158 to step 160, where the test element 16 is lifted away from the conveyor 6 so that the conveyor can be operated to remove the package and to present the next package for testing. Control is then returned to step 40 such that the testing procedure can be repeated.

The conveyor 6 may be of a known design but preferably is of the type described in the co-pending PCT patent application entitled "Conveyor and Converger incorporating a Conveyor" based on GB-9517310.0. Thus, the conveyor may comprise an endless conveyor belt which has a portion thereof disposed next to a rotating drive shaft. A pinch wheel is provided such that it can be moved towards the driving shaft and thereby to trap the conveyor belt between the drive shaft and the pinch wheel so as to impart motion to the belt. Thus, the drive shaft can be continuously driven and need not be accelerated or decelerated in order to control the motion of the belt since the belt is only driven when the pinch wheel urges the belt into contact with the drive shaft.

The test load can be varied by adding weights to, or removing weights from, the test element 16. The fact that the test load is more controllable because pneumatic actuators are not used to apply the load also enables a more sensitive position transducer to be used. The rack and pinion arrangement 26,27 may be replaced by a wheel driven by frictional contact with the test element 16, or by any other suitable position measuring arrangement.

It is thus possible to provide a package tester for use with packages and bags (such as bags of crisps) that is reliable and which, in tests, has located leaks having an equivalent diameter of 10 microns, and which can achieve a higher through-put because the test can be truncated as soon as a faulty package is identified.

What is claimed is:

1. An apparatus for testing for leaks in a package, comprising a test element having a defined weight which is brought into abutment with a stationary package, and a position sensor for measuring a position of the test element, and in which the package is compressed solely by the weight of the test element, in which a first measurement is made of the position of the test element and a plurality of further measurements of the position of the same test element are made, and a comparator compares each further measurement with the first measurement to generate a measured comparison and indicates the package to be faulty when a result of the measured comparison exceeds a predetermined failure criterion value, the test element remaining continuously in contact with the package between the first and further measurements, and in which the test is arranged to be teminated as soon as the failure criterion value is exceeded, said test termination resulting in variable testing time.

2. An apparatus as claimed in claim 1, characterised in that the test element is brought into abutment with an upper surface of the package under test.

3. An apparatus as claimed in claim 1, characterised by at least one actuator arranged to lower and lift the test element into and from contact with the package under test, the at least one actuator and the test element becoming decoupled from one another whilst a test is in progress.

4. An apparatus as claimed in claim 1, in which a plurality of test elements are provided in parallel and/or series, for testing a plurality of packages simultaneously.

5. An apparatus as claimed in claim 1, characterised in that the position of the test element can be measured to a resolution of 0.03 mm or better.

6. An apparatus as claimed in claim 1, characterised in that the apparatus is further arranged to make further measurement during the predetermined time period, and to fail the package if the difference between two of the measurements exceeds a predetermined value.

7. An apparatus as claimed in claim 1, characterised in that at least one test element is carried on a demountable platform, such that at least one test head can be replaced.

8. The apparatus of claim 2 wherein the apparatus includes rejection criteria based on the difference in position between the first measurement and the second measurement, said apparatus being programmed to perform one or more intermediate test measurements between the first measurement and the second measurement, said apparatus being further programmed to reject the package if an intermediate measurement equals or exceeds the rejection criteria.

9. A method of testing for leaks in a package, comprising the steps of bringing a test element of a known weight into abutment with at least a portion of a stationary package to be tested so as to compress the package soley under the weight of the test element, making a first measurement of the position of the test element, making a plurality of further measurements with the same test element to generate a measured comparison, comparing each further measurement with the first measurement and indicating the package to be faulty if the comparison exceeds a predetermined failure criterion value, the test element remaining continuously in contact with the package between making the first and each further measurement, and in which the test is terminated as soon as the failure criterion is exceeded, said test termination resulting in variable testing time.

10. A method as claimed in claim 9, characterised in that the at least one further measurement of position is compared with the first measurement of position.

11. A method as claimed in claim 9, characterised in that each test has a predetermined maximum duration.

12. A method as claimed in claim 11, in which a second measurement is made at the end of the time allotted to the test, and the second measurement is compared with the first measurement.

13. A method as claimed in claim 11, characterised in that a plurality of further measurements of position are made, each is compared with the first measurement before a succeeding measurement is taken, and the test is terminated when a comparison exceeds the predetermined value.

14. The method of claim 9 wherein one or more intermediate test measurements are performed between the first measurement and the further measurement and the package is indicated to be faulty if an intermediate measurement equals or exceeds the rejection criteria value.

* * * * *